July 23, 1957  J. G. BLEEKER  2,800,103
ANIMAL PEN GATE ASSEMBLY
Filed Dec. 7, 1954  2 Sheets-Sheet 1

John G. Bleeker
INVENTOR.

July 23, 1957  J. G. BLEEKER  2,800,103
ANIMAL PEN GATE ASSEMBLY
Filed Dec. 7, 1954  2 Sheets-Sheet 2
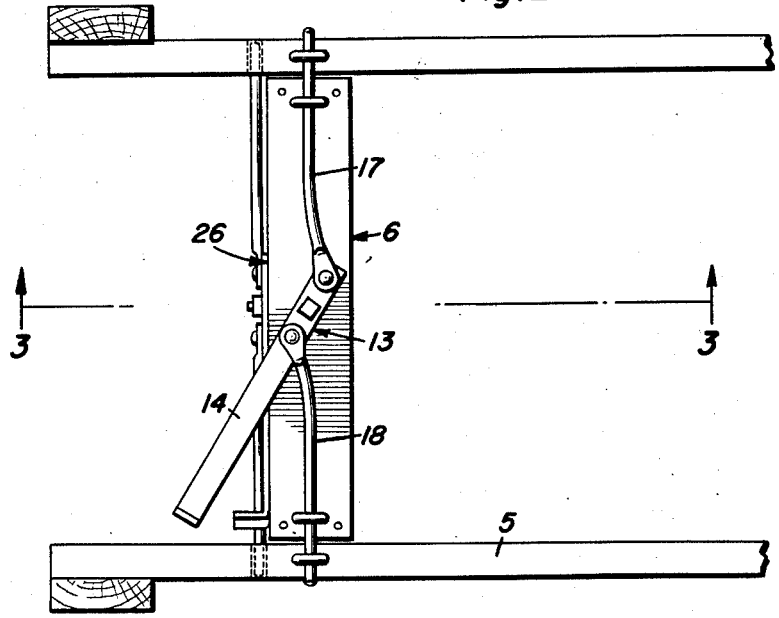
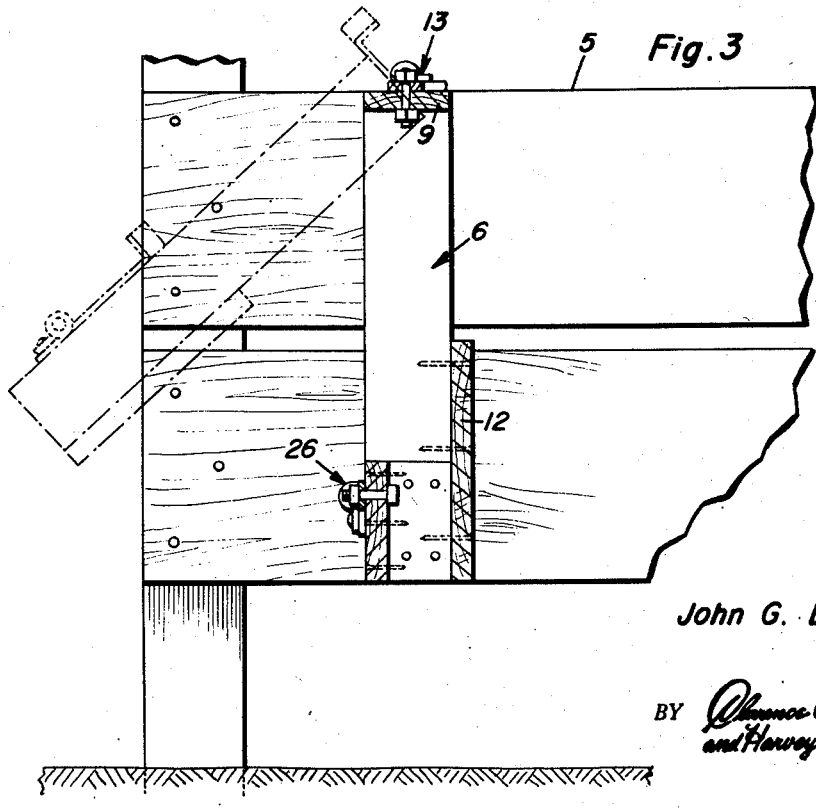
John G. Bleeker
INVENTOR.

United States Patent Office 2,800,103
Patented July 23, 1957

2,800,103
ANIMAL PEN GATE ASSEMBLY
John G. Bleeker, Ackley, Iowa
Application December 7, 1954, Serial No. 473,595
1 Claim. (Cl. 119—20)

The present invention relates to new and useful improvements in gates for animal pens constructed particularly for use in confining a sow in the pen and permitting the free entrance and exit of suckling pigs to the pen.

An important object of the invention is to provide upper and lower latch means for the gate and by means of which the gate is swingably supported on the upper latch means for swinging the gate vertically while the lower latch means secures the gate in its closed position.

Another object of invention is to provide a gate for animal pens and equipping the door with latch means constructed for easily and quickly mounting the gate in the pen and removing the gate therefrom.

A further object is to provide a device of this character of simple and practical construction, which is efficient and reliable in operation, relatively inexpensive to manufacture and otherwise well adapted for the purpose for which the same is intended.

Figure 1:
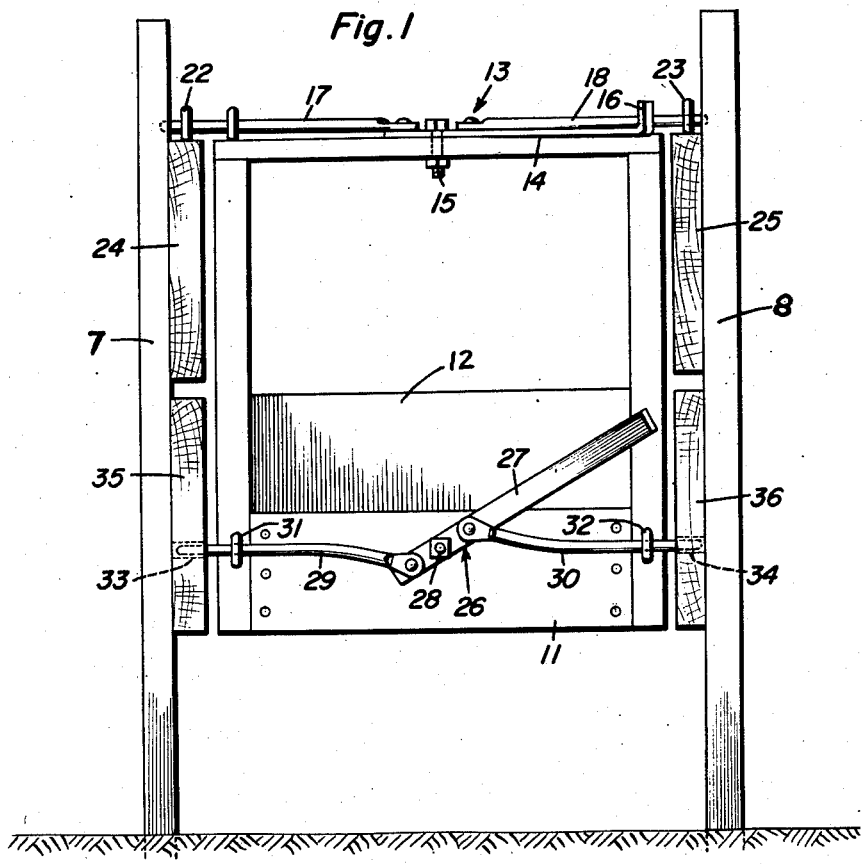
Figure 4:
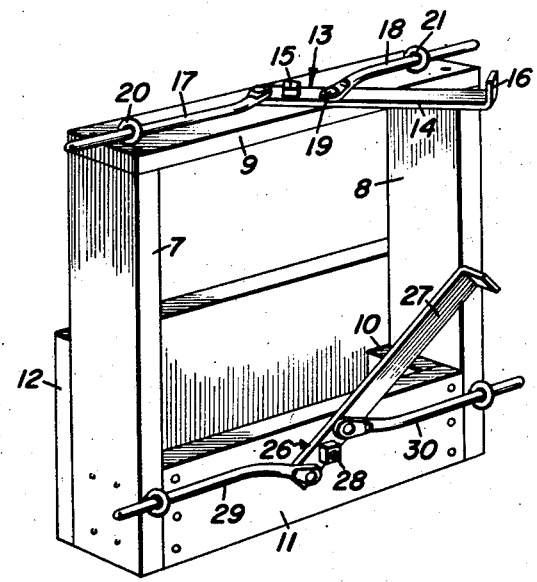

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view;
Figure 2 is a top plan view;
Figure 3 is a longitudinal sectional view taken on a line 3—3 of Figure 2; and
Figure 4 is a perspective view of the removable gate.

Referring now to the drawings in detail, wherein for the purpose of illustration, I have disclosed a preferred embodiment of my invention, the numeral 5 designates a pen in which hogs or other animals may be confined. The front end of the pen is closed by a gate designated generally at 6, and includes a pair of side frame members 7 and 8 on top of which a head frame member 9 is secured. A pair of blocks 10 are secured to the lower inner surfaces of the side frame members 7 and 8 and to which a transverse lower frame member 11 is secured flush with the front edges of the side frame members 7 and 8. The lower portion of the gate is closed by a plank 12 secured to the rear edges of the side frame members 7 and 8.

An upper latch member is designated generally at 13 and includes a lever 14 preferably of strap metal construction which is pivoted adjacent its inner end on top of the head frame member 9 by means of a bolt or the like 15 for horizontal swinging movement of the lever, and the outer end of the lever is formed with an upstanding hand grip 16.

A pair of sliding bolts 17 and 18 are pivotally connected to the lever 14 at opposite sides of the pivot bolt 15 by means of rivets or the like 19, the bolt 17 being pivoted to the lever rearwardly of the bolt 15 while the bolt 18 is pivoted at the lever at a point forwardly of the bolt 15.

Bolt 17 is slidable in a screw eye 20 secured on top of the head frame member 9 adjacent one side of the gate while the bolt 18 is slidable in a screw eye 21 secured on top of the head frame member 9 adjacent an opposite side of the gate. The outer ends of the bolts 17 and 18 are lockably engaged in screw eyes or keepers 22 and 23, respectively, secured on top of the uppermost side rails 24 and 25 of the pin to lock the gate 5 between the side rails of the pen and to swingably support the gate at its upper edge for vertical swinging movement, as shown by dotted lines in Figure 3 of the drawings.

A lower latch member is designated generally at 26 and embodies a construction corresponding to that of upper latch member 13 and includes a lever 27 pivoted adjacent its inner end on a bolt 28 at the front surface of the lower frame member 11.

Sliding bolts 29 and 30 are pivoted at their inner ends to the lever 27 at opposite sides of the pivot bolt 28 and the outer ends of the bolts are slidable in eyes 31 and 32 secured to the lower front edges of side frame members 7 and 8, respectively. The outer ends of the bolts are lockably engaged in openings or recesses 33 and 34, respectively, in the lower rails 35 and 36 of the pin.

The upper and lower latch members 13 and 26 are lockably engaged at the sides of the pin in a position to support the lower edge of the gate elevated above the ground so that suckling pigs may freely enter and leave the pen to be nursed by a sow confined therein.

By unlocking the lower latch member 26, the gate will be free to swing vertically on the bolts 17 and 18 of the upper latch member 13 to admit an animal to the pen or to remove the animal therefrom and the gate is locked by sliding the bolts 29 and 30 into locking engagement with the keepers at the sides of the pen.

The gate may be removed from the pen by releasing both the upper and lower latch members.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In an animal pen that has side walls which are spaced to form a gate opening, a gate having side members and top and bottom members, an upper pair of eyes carried by said side walls and aligned with each other, a lower pair of eyes carried by said gate on one surface thereof and intermediate said top and bottom members, a pair of horizontal retractible rods in said lower pair of eyes, means in said pen side walls to accommodate the outer ends of said rods to lock said gate, a lever pivoted to said bottom member and to the inner ends of said rods to withdraw and extend said rods into said rods accommodating means, an upper pair of horizontal rods, an upper pair of eyes protruding upwardly from said gate top member through which said upper pair of rods extend, an upper lever pivoted on the top surface of said top member and pivoted to the inner ends of said upper rods to actuate said upper rods and thereby connect and disconnect them with said upper pair of eyes, said upper pair of rods establishing an upper hinge axis for said gate, and all of said rods being separable from connection with said side walls so that said gate may be separated from said walls.

References Cited in the file of this patent
UNITED STATES PATENTS

| 55,481 | Freeman | June 12, 1866 |
| 603,163 | Ball | Apr. 26, 1898 |
| 1,230,237 | Sturm | June 19, 1917 |
| 1,257,137 | Smith | Feb. 19, 1918 |
| 1,566,552 | Manson et al. | Dec. 22, 1925 |
| 2,603,895 | Hardy | July 22, 1952 |

FOREIGN PATENTS

| 578,603 | France | July 7, 1924 |